(12) United States Patent
Busch

(10) Patent No.: US 8,339,192 B2
(45) Date of Patent: Dec. 25, 2012

(54) LINE FILTER AND USE OF A LINE FILTER

(75) Inventor: Peter Busch, Augsburg (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 41 days.

(21) Appl. No.: 12/820,197

(22) Filed: Jun. 22, 2010

(65) Prior Publication Data

US 2010/0321104 A1  Dec. 23, 2010

(30) Foreign Application Priority Data

Jun. 22, 2009  (DE) .................. 10 2009 029 843

(51) Int. Cl.
*H03K 5/00* (2006.01)
(52) U.S. Cl. ............... 327/558; 327/552; 307/130
(58) Field of Classification Search .......... 327/336–337, 327/551–559; 307/130
See application file for complete search history.

(56) References Cited

U.S. PATENT DOCUMENTS

| | | | | |
|---|---|---|---|---|
| 3,541,392 A | * | 11/1970 | Vargo et al. ............... | 361/59 |
| 4,757,341 A | * | 7/1988 | Tanigawa .................. | 327/463 |
| 5,065,074 A | * | 11/1991 | Hesketh et al. ........... | 315/209 R |
| 6,140,863 A | * | 10/2000 | Fujisawa .................. | 327/540 |

FOREIGN PATENT DOCUMENTS

| | | |
|---|---|---|
| JP | 08-308236 A | 11/1996 |
| JP | 2001-095261 A | 4/2001 |
| JP | 2001-306160 A | 11/2001 |
| WO | 2008/086891 A1 | 7/2008 |

\* cited by examiner

*Primary Examiner* — Dinh T. Le
(74) *Attorney, Agent, or Firm* — DLA Piper LLP (US)

(57) ABSTRACT

A line filter includes at least one X capacitor located between two supply lines and at least one discharge resistor that discharges the X capacitor, wherein the discharge resistor is arranged in series with at least one switching element, and at least one detector circuit that detects a network disconnection and closes the switching element to discharge the X capacitor via the discharge resistor when a network disconnection is recognized.

13 Claims, 3 Drawing Sheets

LINE FILTER AND USE OF A LINE FILTER

RELATED APPLICATION

This application claims priority of German Patent Application No. 10 2009 029 843.6, filed Jun. 22, 2009, herein incorporated by reference.

TECHNICAL FIELD

This disclosure relates to a line filter with an X capacitor connected between two supply lines and at least one discharge resistor for discharging the X capacitor. The disclosure further relates to the use of such a line filter.

BACKGROUND

Line filters with so-called "X" capacitors connected between supply lines of a power supply network, for example, between a phase conductor and a neutral conductor or between two phase conductors are widely known. They are used to suppress differential-mode interference voltages, i.e., interference voltages between supply lines of the type caused by electrical loads.

FIG. 3 shows an example of a known line filter 1. Two X capacitors CX1 and CX2 and a discharge resistor RX are connected between a phase conductor Ph and a neutral conductor N. The line filter 1 further comprises two inductors L1 and L2 in the phase line Ph and the neutral conductor N, respectively.

The inductors L1 and L2 attenuate common-mode parasitic interference currents, i.e., interference currents that appear in identical phase on the phase conductor Ph and the neutral conductor N relative to the ground potential. Additional capacitors, known as "Y" capacitors, can additionally be arranged between the phase conductor Ph and the neutral conductor N, respectively, and a ground conductor. However, they are not shown in FIG. 3.

The X capacitor CX1 is arranged on the network-side upstream of the two inductors L1 and L2 of the phase conductor Ph and the neutral conductor N, respectively. The X capacitor CX2 is arranged downstream of the inductors L1 and L2. The X capacitors CX1 and CX2 suppress differential mode interference caused by a load at the output of the filter on the right side to prevent influencing of the network voltage as much as possible.

In particular, for computer switching mode power supplies, which have a relatively high power of generally more than 100 W, the X capacitors have relatively large dimensions. If the line filter 1 is disconnected from the power supply network, a relatively large charge remains in the X capacitors with a voltage that corresponds to the network voltage at the time of the interruption. This residual charge can cause dangerous electric shocks in the case of contact with a network plug, for example.

To prevent this, the discharge resistor RX connects between the phase conductor Ph and the neutral conductor N, and discharges the X capacitors CX1 and CX2 within a defined short time span when the network connection is interrupted. According to relevant specifications such as the VDE Standard "Information technology equipment—Safety, DIN EN 60950-1," a discharge to less than 37% of the initial value must take place within a time of less than one second. Alternatively, the total capacitance of all X capacitors must be limited to a value of at most 100 nF.

One problem with the above-described circuit is that the discharge resistor RX inserted between the phase conductor Ph and the neutral conductor N leads to a power loss, both during operation of an electrical device downstream of the line filter and in a so-called "standby" state, in which the electrical device is supplied only with an auxiliary voltage. If the line filter for a switching power supply for a computer system is dimensioned at approximately 200 W, a power loss of roughly 100 mW results from a discharge resistor RX of 500 kΩ for example. If the computer system is in a standby state with a power consumption of 5 W, for example, the power loss amounts to 2% of the total power.

It could therefore be helpful to reduce power loss of a line filter, both when switched on and in the so-called "standby" operation of an electronic device coupled to the line filter. Electrical safety, particularly when pulling a power cord of the electronic device, should be preserved as well.

SUMMARY

I provide a line filter including at least one X capacitor located between two supply lines and at least one discharge resistor that discharges the X capacitor, wherein the discharge resistor is arranged in series with at least one switching element, and at least one detector circuit that detects a network disconnection and closes the switching element to discharge the X capacitor via the discharge resistor when a network disconnection is recognized.

I also provide a power supply unit including the line filter and at least one switching converter for supplying an electronic device.

LIST OF REFERENCE NUMBERS

Figure 1:
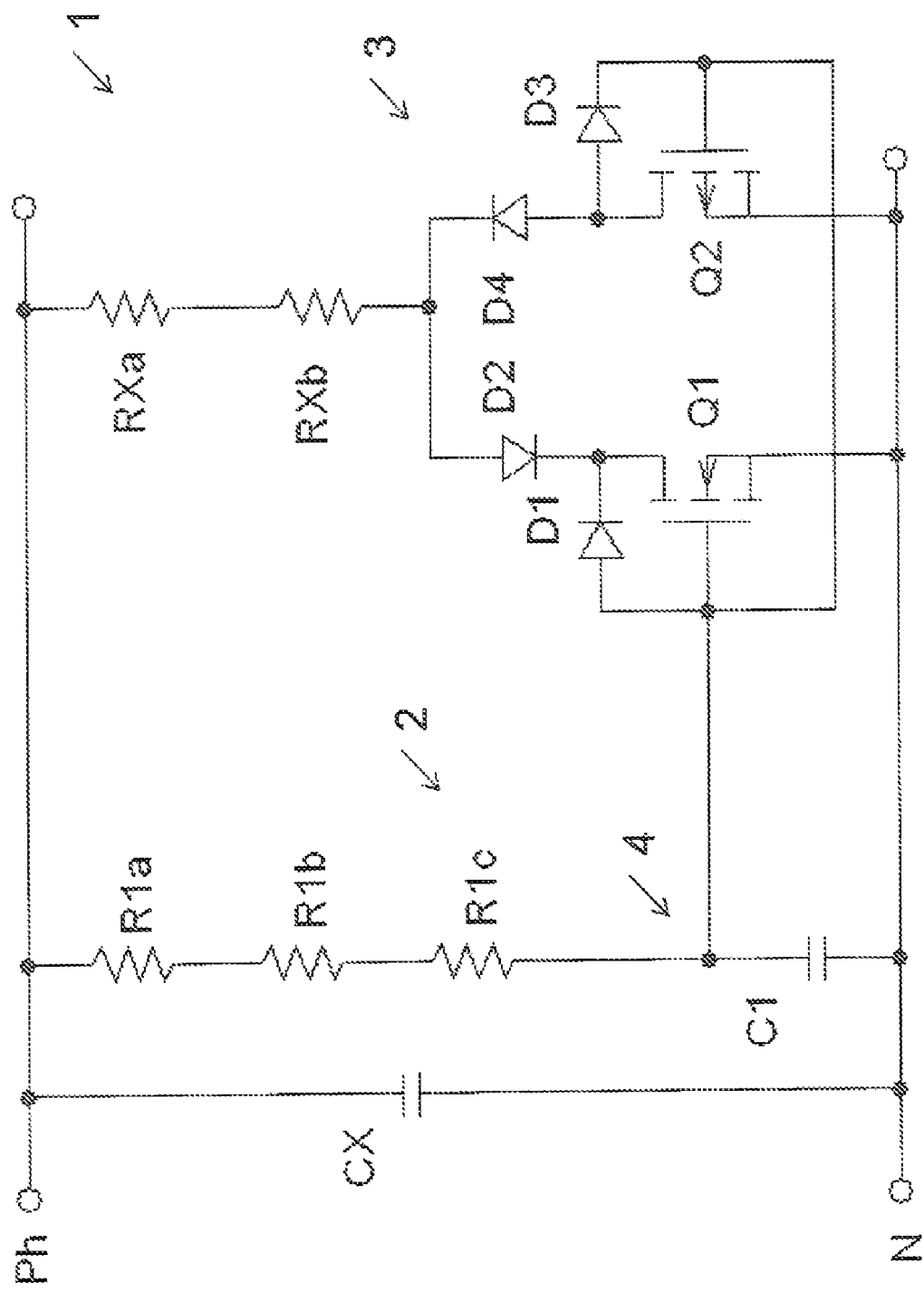
FIG. 1 is a circuit diagram of a line filter according to a first configuration.

1 Line filter
2 Detector circuit
3 Discharge circuit
4 Node
5 Power supply unit
6 Main converter
7 Auxiliary converter
CX X capacitor
RX Discharge resistor
C1 Capacitor
R1 Resistor
D1-D4 Diode
Q1, Q2 MOSFET
Ph Phase conductor
N Neutral conductor
$V_{main}$ Operating voltage
$V_{aux}$ Auxiliary voltage

DETAILED DESCRIPTION

It will be appreciated that the following description is intended to refer to specific examples of structure selected for illustration in the drawings and is not intended to define or limit the disclosure, other than in the appended claims.

I provide a line filter characterized in that the discharge resistor connects in series to at least one switching element, and the line filter comprises at least one detector circuit that detects a network disconnection set up to close the switching element to discharge the X capacitor when a network disconnection is recognized.

During normal operation of the line filter, i.e., when the line filter is connected to a power supply network, the discharge resistor is disconnected from the supply lines by the switching element connected in series to the discharge resistor. The additional detector circuit ensures that, when a network disconnection is detected, the X capacitor is safely discharged via the discharge resistor so that no dangerous charge remains in the X capacitor after disconnection of the line filter.

The detector circuit may essentially comprise a low-pass filter to detect an alternating or AC voltage of a power supply network. Low-pass filters can be constructed relatively simply and allow easy and secure recognition of a network AC voltage.

The low-pass filter may comprise a voltage divider with at least one resistor and at least one capacitor connected in series to the resistor, wherein an electric potential between the resistor and the capacitor remains below a predetermined electric potential in the presence of the AC voltage from the power supply network on the two supply lines, and rises above the predetermined electric potential if the line filter is disconnected from the supply network. Such a circuit arrangement comprises only two passive components and allows a disconnection of the line filter from the power supply network to be securely recognized.

The at least one switching element may be constructed as a semiconductor switching element with at least one control input, in particular, as a MOSFET, the detector circuit being connected to the control input. A simple, voltage-controlled discharge circuit for the network filter can be implemented by using a semiconductor switching element, in particular, a MOSFET.

The line filter may comprise a first switching element and a second switching element, the detector circuit being set up to close the first switching element when a disconnection of the network voltage is detected during a positive half-wave of a network voltage, and to close the second switching element when a disconnection of the network voltage is detected during a negative half-wave of a network voltage. By using different switching elements for discharging the X capacitor in the case of disconnection during a positive and during a negative half-wave, respectively, the circuit structure can be further simplified. In particular, it is possible to do without a rectification of the voltage detected by a voltage divider.

The above-mentioned line filter is particularly suitable for use in a power supply unit with at least one switching converter for supplying an electronic device. The line filter can advantageously be used in a power supply unit with at least one first switching converter to supply the electronic device in a switched-on state and a second switching converter to supply the electronic device in a standby state, the first and second switching converters jointly connected to the line filter.

The line filter is advantageously dimensioned such that it is sufficient to suppress the network noise caused in an on-state by the first switching converter to supply the electronic device, and at the same time does not create an unnecessarily large power loss in the standby state when the electronic device is supplied by the second switching converter.

Additional advantageous configurations will be explained in more detail below.

FIG. 1 shows a line filter 1 with a detector circuit 2 and a discharge circuit 3. The line filter 1 further comprises an X capacitor CX. In FIG. 1, only a single X capacitor CX arranged on the primary side is shown. However, the line filter 1 can comprise additional capacitors or inductors for filtering voltage or current noise. These are not shown in the FIG. 1, however, for the sake of simplicity.

The detector circuit 2 detects a primary-side interruption of a phase conductor Ph or a neutral conductor N because in this case there is not an AC voltage, but only a positive or negative DC voltage of the X capacitor between the supply lines Ph and N. For example, a positive or a negative voltage remains in the primary-side X capacitor CX when a network plug is pulled out.

The detector circuit 2 in FIG. 1 comprises in essence a voltage divider acting as a low-pass filter. The voltage divider comprises a resistor R1 and a capacitor C1. The resistor R1 is formed by a plurality of series-connected sub-resistors R1a-R1c.

The discharge circuit 3 comprises a discharge resistor RX which consists of several sub-resistors RXa and RXb, as well as two switching elements Q1 and Q2 arranged in parallel to one another and in series with the discharge resistor RX. The switching element Q1 is a self-blocking n-channel MOSFET, and the switching element Q2 is a self-blocking p-channel MOSFET. To prevent a current flow in the blocking direction across the body diodes of the MOSFETs Q1 and Q2, the MOSFETs Q1 and Q2 are each connected in series to a diode D2, D4, respectively, which are arranged with reverse polarity relative to the body diodes of the MOSFETs Q1 and Q2. In addition, two diodes D1, D3 are provided between the drain terminals and the gate terminals of the MOSFETs Q1 and Q2, respectively, to prevent a rise of the gate voltage substantially above a switch-on threshold of the MOSFETs Q1 and Q2, respectively.

The total resistance value of the resistor R1 is selected to be sufficiently large that a large part of the network voltage drops at the resistor R1 in operation of the line filter. For example, it has a total resistance value of roughly 100 MΩ. On the other hand, the capacitance of the capacitor C1 is selected to be relatively small, for example, a capacitance of 100 nF, so that no substantial reactive power is produced by charging and discharging of the capacitor C1 and no dangerous charge remains in the capacitor C1 after disconnection of the line filter from the power supply network.

Depending on the network frequency for the intended purpose and the network voltage to be used, precise dimensioning of the resistor R1 and the capacitor C1 is selected in such a manner that there is a voltage at a node 4 between the resistor R1 and the capacitor C1 that lies in operation below a predetermined switch-on threshold of a connected switching element, for example, a gate voltage of roughly 2 V for the MOSFETs Q1 and Q2. During operation of the line filter, the voltage at the node 4 remains below this switch-on threshold because the network voltage continuously alternates from negative to positive polarity and back again so that the capacitor C1 is alternately charged with a positive and a negative voltage, the resistor R1 preventing a rapid increase of the capacitor voltage.

If a network connection is cut off, then the X capacitor CX remains charged with a momentary voltage that was present between the supply lines Ph and N at the disconnection time. This voltage at the X capacitor CX charges the capacitor C1 via the resistor R1 in a relatively short time, for example, a time span of 300 ms, to a voltage above the switch-on threshold of a switching element connected to the node 4.

In the case of a positive voltage at the X capacitor CX when the network is cut off, the capacitor C1 is charged via the resistor R1 to a positive voltage and switches on the n-channel MOSFET Q1. The X capacitor CX is discharged via the drain terminal of the MOSFET Q1, the diode D2 and the discharge resistor CX. The discharge resistor RX is dimensioned such that, within a remaining time of, for example, 700 ms after the recognition until a full second has elapsed, it discharges the capacitor CX to clearly below a threshold of 37% of the initial voltage. For example, the discharge resistor RX has a total resistance of 250 kΩ. The diode D1 prevents further charging of the capacitor C1 markedly above the positive switch-on threshold of the MOSFET Q1. This allows the use of a low-voltage capacitor as capacitor C1.

In case there is a negative supply voltage at the X capacitor CX when the supply line is disconnected, the p-channel MOSFET Q2 is switched on by the negative voltage at the node 4. The capacitor CX then discharges via the drain terminal of the MOSFET Q2, the diode D4 and the discharge resistor RX. The diode D3 prevents further charging of the capacitor C1 markedly below the negative switch-on threshold of the MOSFET Q2.

Since the capacitor C1 is charged both in the positive and the negative direction in the course of a positive or negative half-wave, respectively, of the network supply voltage, it must be configured as a non-polarized capacitor. Because of the relatively low capacitance and maxi-mum voltage of the capacitor C1, an inexpensive ceramic capacitor is suitable.

The safety of the circuit shown in the FIG. 1 can be improved by different optional measures to ensure functioning of the line filter 1, the detector circuit 2 and the discharge circuit 3 even in the case of the destruction of one of the components that is used.

For example, two Zener diodes with a reverse voltage of roughly 18 V connected back-to-back in series can be connected in parallel to the capacitor C1. If there is an interruption between the gate and drain terminals of the MOSFETs Q1 or Q2 due to the destruction of one of the diodes D1 or D3, respectively, an overvoltage between the node 4 and the neutral conductor N is diverted via the Zener diodes so that an overvoltage at the capacitor C1 and the gate terminals of the MOSFETs Q1, Q2, respectively, is avoided.

Alternatively or additionally, two parallel diodes D1a, D1b and D3a, D3b can be connected in place of the individual diodes D1, D3, respectively, with this circuit having the advantage that, unlike the situation if Zener diodes are used, no leakage current flows in operation.

Additionally, the capacitor C1 of the low-pass filter can be divided into a series circuit consisting of a first capacitor C1a and a second capacitor C1b. In the case of a short-circuit of one of the two capacitors, the circuit continues to function as before with only the time constant of the low-pass filter changing.

Figure 3:
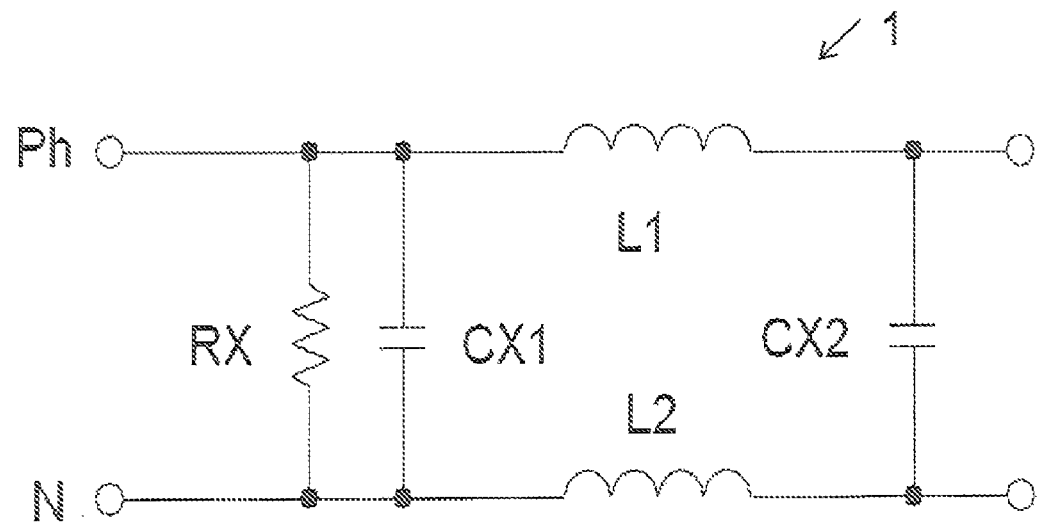
FIG. 3 is a circuit diagram of a line filter according to prior art.

The circuit shown in FIG. 1 and described above reduces the power consumption of the line filter 1 in standby operation to roughly 0.5 mW as compared to a power consumption of roughly 100 mW by known circuits such as according to FIG. 3, i.e., by a factor of 200. Hence, a considerable improvement of the efficiency of an electronic device, particularly in the standby state, can be achieved.

Figure 2:
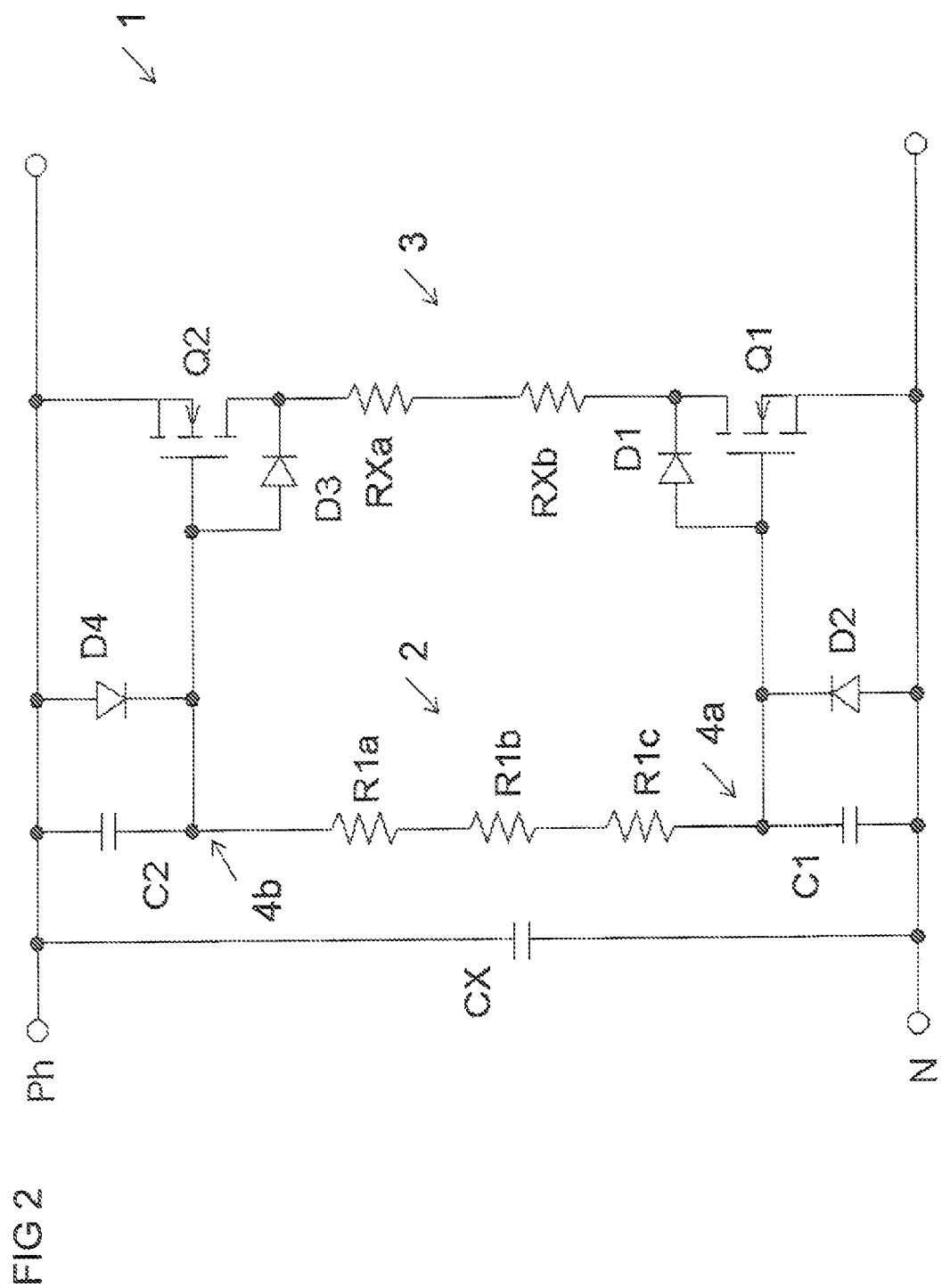
FIG. 2 is a circuit diagram of a line filter according to a second configuration.

FIG. 2 shows a second example of a line filter 1. The line filter 1 according to the second example likewise contains an X capacitor CX connected between a phase line Ph and a neutral line N. The line filter 1 additionally comprises a detector circuit 2 and a discharge circuit 3.

The detector circuit 2 comprises a low-pass filter constructed as a voltage divider. Unlike the voltage divider according to the first example, a first capacitor C1 and a second capacitor C2 connect symmetrically upstream and downstream, respectively, of a resistor R1 in the second example. In the operation of the line filter 1, a large part of the network voltage drops at the resistor R1, which again has a resistance of 100 MΩ, for example. On the other hand, a relatively small part of a positive or negative half-wave of the network voltage drops at the capacitors C1 or C2, while the respective other capacitor C2 or C1 is bridged via the diodes D4, D2, respectively.

The discharge circuit 3 is likewise symmetrically constructed. In addition to a discharge resistor RX, which is constructed in the example as two series-connected resistors RXa and RXb, two self-blocking n-channel MOSFETs Q1 and Q2 are likewise connected thereto in series. The MOSFETs Q1 and Q2 are arranged such that their respective drain terminals are oriented in the direction of the central discharge resistor RX. The MOSFETs Q1 and Q2 each have a parasitic body diode that enables a flow of current from the source terminal to the drain terminal of the MOSFET Q1 or Q2, even with the control voltage at their respective gate terminals shut off. However, since the two MOSFETs are arranged with alternate polarities, no current flows across the discharge resistor RX without the presence of a gate voltage at one of the MOSFETs Q1 or Q2.

If one of the supply lines Ph or N is disconnected while there is a positive capacitor voltage at the X capacitor CX, the capacitor C1 is charged via the diode D4 and the resistor R1. The voltage at a first node 4a therefore rises above a switch-on voltage of the n-channel MOSFET Q1. The X capacitor CX is discharged via the drain terminal of the MOSFET Q1, the discharge resistor RX and the parasitic body diode of the MOSFET Q2. The discharge resistor RX is again dimensioned such that, within a remaining time, for example, within a remaining time of 700 ms after recognition until a full second, it discharges the X capacitor CX to clearly below a threshold of 37% of the initial voltage. For example, it has a total resistance value of roughly 250 kΩ.

A diode D1 connected between the drain terminal and the gate terminal of the MOSFET Q1 prevents further charging of the low-pass capacitor C1 and the gate terminal of the MOSFET Q1 markedly above the switch-on threshold of the MOSFET Q1. This enables the use of a low-voltage capacitor as capacitor C1 and prevents destruction of the MOSFET Q1. An electrolytic capacitor can also be used as capacitor C1 so long as it tolerates a slight polarization by the diode D2 in a negative half-wave of the supply voltage In the case of a negative capacitor voltage at the moment of network disconnection, the n-channel MOSFET Q2 switches on, because in this case there is a positive voltage at a node 4b relative to the phase conductor Ph. The X capacitor CX is discharged via the drain terminal of the MOSFET Q2, the discharge resistor RX and the reverse-conducting parasitic body diode of the MOSFET Q1. The diode D3 prevents further charging of the capacitor C1 markedly above the switch-on threshold of the MOSFET Q2. The capacitor C2 can also be configured as a polarized low-voltage electrolytic capacitor so long as it tolerates the slight polarization by the diode D4 in a positive half-wave of the supply voltage.

The circuit according to the second example can also be further improved to achieve a protective effect even if individual components fail. In particular, the diodes D2 and D4 can be configured as Zener diodes with a Zener voltage of, for example, 18 V. If one of the diodes D1 or D3 is destroyed so that the connection between the gate and the drain terminal of the MOSFET Q1, Q2, respectively, is interrupted, the Zener diodes therefore prevent overcharging of the capacitors C1, C2 respectively.

Alternatively, the diodes D1 or D3 can be replaced by respective parallel diodes D1a, D1b or D3a, D3b, with no leakage current flowing in this case, as explained above.

In addition, the capacitors C1 and C2 can be subdivided into respective series circuits of sub-capacitors C1a, C1b and C2a, C3b. In the case of a short circuit of one capacitor, the circuit continues to function, with a slightly changed time constant.

Improvement of the effective power of the line filter corresponds to that described for the first example. However, the circuit according to the second example can be implemented more cost-effectively since only relatively inexpensive n-channel MOSFETs Q1 and Q2 are required.

Figure 4:
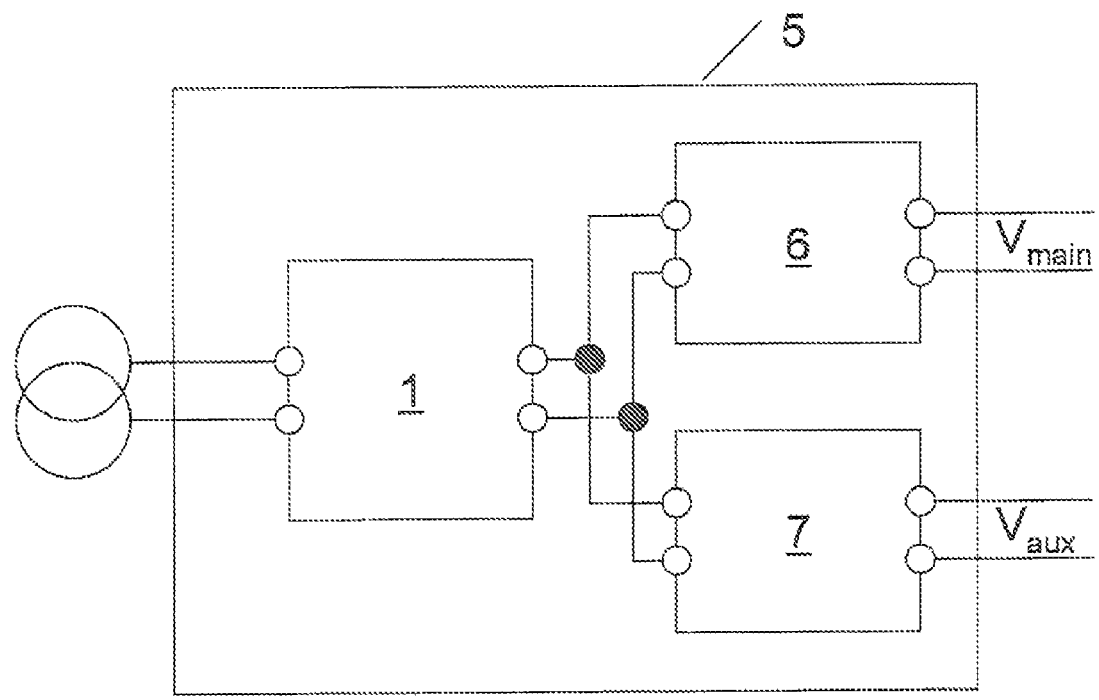
FIG. 4 is a schematic representation of a use of the line filter in a power supply unit.

FIG. 4 shows the use of a line filter 1 in a power supply unit 5 of an electronic device. A main converter 6 as well as an auxiliary converter 7 are arranged downstream of the line filter 1. The main converter 6 and the auxiliary converter 7 each comprise a switching converter for generating an operating voltage $V_{main}$ or an auxiliary voltage $V_{aux}$ for operating the electronic device.

The line filter 1 is dimensioned such that it can suppress the switching power of 200 W, for example, of the high-power main converter 6 according to the applicable regulations for the power supply network. The auxiliary converter 7, which has a markedly lower power of 1-5 W, for example, can be operated via the relatively large-dimensioned line filter without the occurrence of a significant power loss in standby operation of the electronic device.

Although the apparatus and methods have been described in connection with specific forms thereof, it will be appreciated that a wide variety of equivalents may be substituted for the specified elements described herein without departing from the spirit and scope of this disclosure as described in the appended claims.

The invention claimed is:

1. A line filter comprising:
    at least one X capacitor that supresses differential-mode interference voltages and which is electrically coupled between two supply lines to supply an alternating voltage from a power supply network;
    at least one discharge resistor configured to discharge the X capacitor, wherein the discharge resistor is arranged in series with at least one switching element between the two supply lines; and
    at least one detector circuit electrically connected to the two supply lines and the switching element and configured to detect a disconnection of the line filter from the power supply network and to close the switching element to discharge the X capacitor via the discharge resistor when a disconnection is detected during a positive and during a negative half-wave, respectively, of the alternating voltage of the power supply network.

2. The line filter according to claim 1, wherein the detector circuit comprises a low-pass filter that detects the alternating voltage of the power supply network.

3. The line filter according to claim 2, wherein the low-pass filter comprises a voltage divider with at least one resistor and at least one capacitor connected in series to the resistor, and wherein an electric potential between the resistor and the capacitor remains below a predetermined electric potential in presence of the alternating voltage from power supply network on the two supply lines and rises above the predetermined electric potential if the line filter is disconnected from the power supply network.

4. The line filter according to claim 3, wherein an increase of voltage at the capacitor is limited by at least one semiconductor diode.

5. The line filter according to claim 1, wherein the at least one switching element is constructed as a semiconductor switching element with at least one control input and the detector circuit is connected to the control input of the semiconductor switching element.

6. The line filter according to claim 1, wherein the switching element comprises a first switching element and a second switching element, and the detector circuit is configured to close the first switching element when a disconnection of the line filter is detected during the positive half-wave of the alternating voltage, and to close the second switching element when a disconnection of the line filter is detected during the negative half-wave of the alternating voltage.

7. The line filter according to claim 6, wherein the first and the second switching elements are arranged in parallel to one another and in series with a first and second diode, respectively.

8. The line filter according to claim 6, wherein the first switching element, the discharge resistor and the second switching element are arranged in series, the first switching element being self-conductive in a first direction of a discharge current and the second switching element being self-conductive in a second direction of the discharge current.

9. A power supply unit comprising at least one first switching converter for supplying an electronic device with a supply voltage and a line filter, the line filter comprising:
    at least one X capacitor that supresses differential-mode interference voltages and which is electrically coupled between two supply lines to supply an alternating voltage from a power supply network to the at least one first switching converter;
    at least one discharge resistor configured to discharge the X capacitor, wherein the discharge resistor is arranged in series with at least one switching element between the two supply lines; and
    at least one detector circuit electrically connected to the two supply lines and the switching element, and is configured to detect a disconnection of the line filter from the power supply network and to close the switching element to discharge the X capacitor via the discharge resistor when a disconnection is detected during a positive and during a negative half-wave, respectively, of the alternating voltage of the power supply network.

10. The power supply unit according to claim 9, further comprising at least one second switching converter, wherein the at least one first switching converter is configured to supply the electronic device in a switched on state and the at least one second switching converter is configured to supply the electronic device in a standby state, the first and second switching converters being jointly connected to the line filter.

11. The line filter according to claim 5, wherein the semiconductor switching element comprises a MOSFET.

12. The line filter according to claim 1, wherein the at least one detector circuit is configured to detect an interruption of at least one of the two supply lines on a primary side of the line filter by detecting a presence of a DC voltage at the at least one X capacitor.

13. A line filter having a primary side for connecting the line filter to a power supply network and a secondary side for connecting the line filter to an electrical load, the line filter comprising:
    at least one X capacitor that suppresses differential-mode interference voltages, and which is electrically coupled between a phase line and a neutral line to supply an alternating voltage from the power supply network to the electrical load;

at least one discharge resistor that is configured to discharge the X capacitor, and which is arranged in series with at least one switching element between the phase line and neutral line; and at least one detector circuit electrically connected to the phase line, the neutral line and the switching element, wherein the detector circuit is configured to detect an interruption of the phase line or the neutral line on the primary side of the line filter by detecting a presence of a DC voltage at the at least one X capacitor to close the switching element to discharge the X capacitor via the discharge resistor when the interruption is detected during a positive and during a negative half-wave, respectively, of the alternating voltage of the power supply network.

* * * * *